FREQUENCY DIVIDING SYNCHRONOUS SATURABLE CORE OSCILLATOR HAVING HIGH FREQUENCY SIGNAL EFFECTIVE ONLY AT SATURATION

Original Filed June 27, 1962

INVENTOR.
WILMER C. ANDERSON
BY H. H. Hulse
ATTY.

3,369,194

FREQUENCY DIVIDING SYNCHRONOUS SATURABLE CORE OSCILLATOR HAVING HIGH FREQUENCY SIGNAL EFFECTIVE ONLY AT SATURATION

Wilmer C. Anderson, Greenwich, Conn., assignor to General Time Corporation, Stamford, Conn., a corporation of Delaware Continuation of application Ser. No. 205,618, June 27, 1962. This application Sept. 26, 1966, Ser. No. 584,631
12 Claims. (Cl. 331—113)

ABSTRACT OF THE DISCLOSURE

A frequency dividing synchronous oscillator including a transformer having a core of readily saturated magnetic material with a generally rectangular hysteresis loop, and a winding on the core, a source of supply voltage, and a pair of transistors supplied by the voltage source and having input and output circuits connected to the transformer winding symmetrically in opposed phase relation so that the transistors conduct alternately, passing a square wave of current at a constant magnitude over a longer interval prior to saturation followed by a sharp peak of current over a short time interval in the region of saturation. Precise frequency division is achieved at ratios as high as 1000:1 by providing a high frequency synchronizing signal having a period of oscillation which is only a small fraction of the period of the square wave, and control means which render the synchronizing signal ineffective during the major portion of the oscillatory cycle of the transformer prior to saturation, and which renders the synchronizing signal effective only during the short interval in the region of saturation to correctively adjust the frequency of oscillation of the transformer so that it is held at a precise sub-multiple of the frequency of the synchronizing signal. In the embodiment of FIGURE 1, the synchronizing signal is applied to the transformer via an auxiliary winding which produces an auxiliary flux signal in the core effective only in the region of saturation to correctively accelerate or delay saturation, so that the synchronizing signal is ineffective at all other times. In the embodiment of FIGURE 3, a phase detector is associated with the oscillator with a negative biasing means associated therewith so that the phase detector responds to the high frequency synchronizing signal only during the sharp current peaks, when the voltage biases sufficiently to neutralize the opposing bias.

Figures 1, 2:
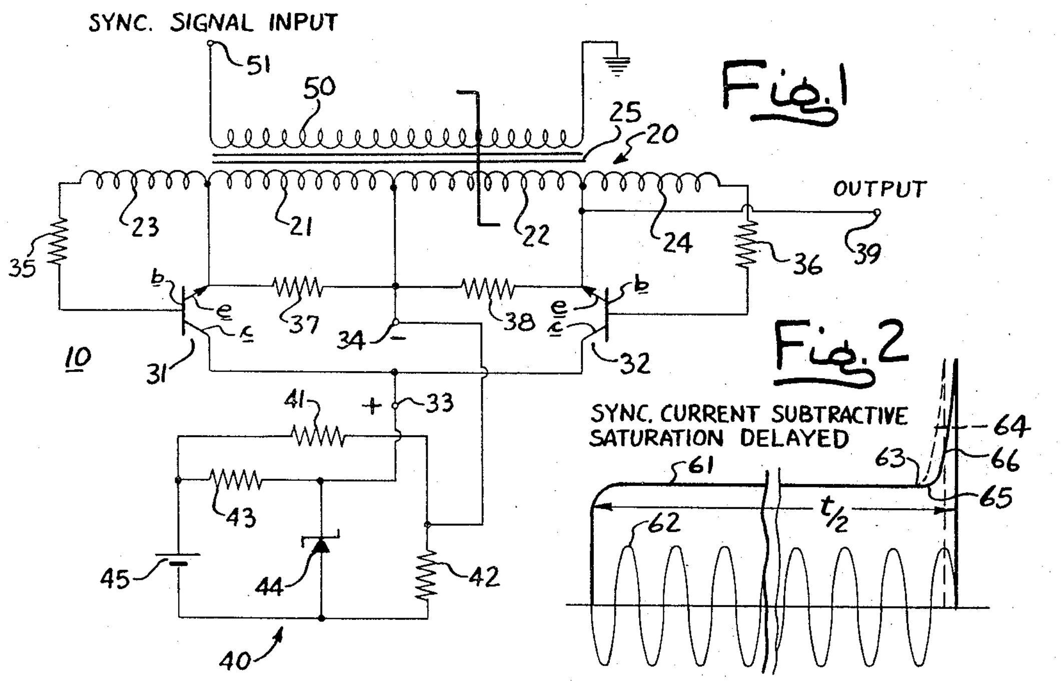

This is a continuation of application Ser. No. 205,618, filed June 27, 1962, now abandoned, entitled, Frequency Dividing Synchronous Oscillator.

The present invention relates to frequency dividing synchronous oscillators and more particularly to a magnetic oscillator for producing an output signal which is an exact submultiple of an input signal.

It is known to synchronize a free-running oscillator with a high frequency input signal so that the oscillator oscillates at some submultiple of the signal. However, it has not been possible in the past to secure high division ratios, say greater than about 10:1, except by resort to complex and expensive circuitry. Even where the usage may justify the expense of complex circuitry, there is a sacrifice of stability and reliability when attempts are made to extend the dividing ratio appreciably beyond a factor of ten.

It is an object of the present invention to provide a novel frequency dividing synchronous oscillator which is extremely simple but which enables high division ratios to be achieved, ratios on the order of 500:1. It is another object to provide a frequency dividing synchronous oscillator which incorporates a novel magnetic oscillator which is adjusted to oscillate at a frequency which is a certain desired submultiple of the input frequency but in which the oscillator is responsive to a synchronizing wave only during an extremely small portion of the desired period of oscillation on the order of one-thousandth of the total period, while being non-responsive during the remainder of the time. This insures that the divider will respond to only a desired one of the cycles in the synchronizing wave, say each five-hundredth cycle, while being immune to the adjacent cycles which would introduce error. It is still another object to provide a frequency dividing synchronous oscillator which is capable of high division ratios but which is relatively insensitive to the magnitude of or wave shape of the input wave. It is yet another object, related to the foregoing, to provide a frequency dividing synchronous oscillator producing an output wave which is of low impedance and relatively high power but which is capable of being reliable excited by an input signal which is of relatively high impedance and low power. Consequently it is an object to provide a frequency dividing synchronous oscillator which, in addition to its division function, is capable of serving as a power amplifier.

It is yet another object to provide a frequency dividing synchronous oscillator capable of operating at a high division ratio but which may be simply and compactly constructed using a small number of readily available parts and which produces a stable and reliable output even in the face of wide swings in ambient temperature. It is another object to provide a frequency dividing synchonous oscillator which may be employed as a building block in more complex control, communication and computing systems for remote unattended operation and where the highest order of reliability is essential.

Other objects and advantages of the invention will become apparent upon reading the attached detailed description and upon reference to the drawings in which:

FIGURE 1 is a schematic diagram showing a preferred form of frequency dividing synchronous oscillator.

Figure 1A:
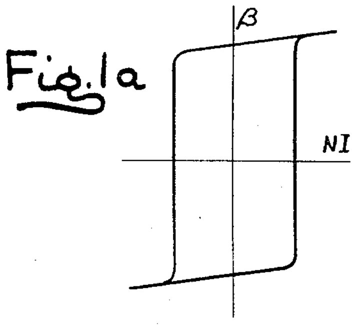

FIG. 1*a* shows the form of hysteresis loop which characterizes the core shown in FIG. 1.

FIG. 2 shows the relation between the input and output waves during a typical half cycle of operation and illustrating particularly the small time interval when the oscillator is receptive to a controlling input pulse, where the oscillator tends to be slightly "fast."

Figure 2A:
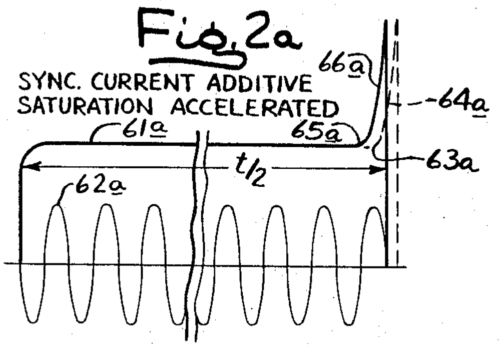

FIG. 2*a* is similar to FIG. 2 with the oscillator tending to be slightly "slow."

Figure 3:
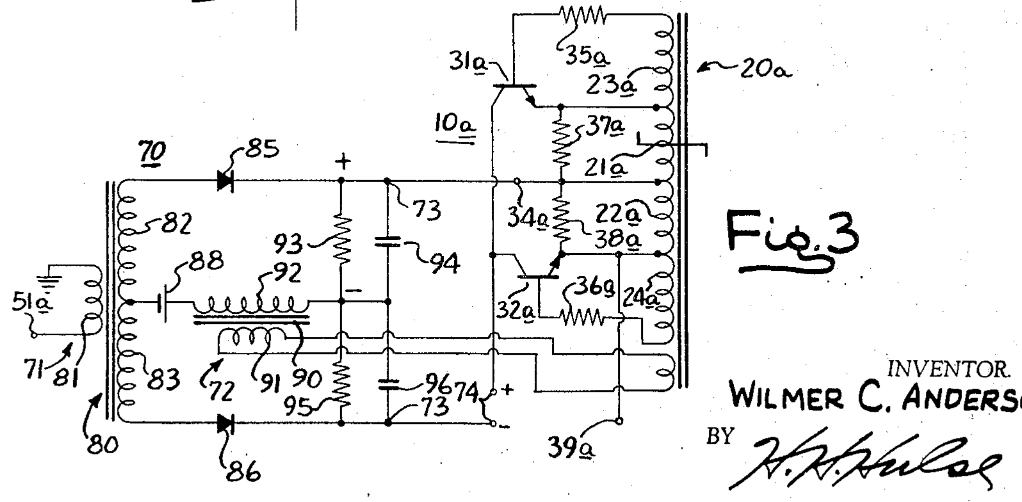

FIG. 3 is a schematic diagram of a modified form of the present invention employing a phase detector.

While the invention has been described in connection with certain preferred embodiments, it will be understood that I do not intend to be limited to the embodiments shown but on the contrary intend to cover the various alternative and equivalent constructions included within the spirit and scope of the appended claims.

Turning now to FIG. 1 there is schematically set forth a frequency dividing synchronous oscillator 10 constructed in accordance with the present invention. The frequency dividing synchronous oscillator includes a transformer 20 having windings 21, 22, 23, 24 surrounding a core 25. The core is composed of readily saturated magnetic material characterized by a generally rectangular hysteresis loop, such as illustrated in FIG. 1*a*. Such core material is sold under the trade names Orthonik, Deltamax, etc. by G-L Electronics, and Magnetics, Inc. In a practical case the core may consist of a length of ribbon about one quarter inch in width and about 0.001 or less in thickness wound into a toroid linking the windings 21–24.

Switches are provided having input and output circuits symmetrically connected to the transformer windings in opposed phase relation and with feedback to the input circuits so that the core is alternately driven to the condition of positive and negative saturation. In the present instance the switches are in the form of transistors 31, 32 having base emitter and collector terminals *b*, *e* and *c* respectively. The windings 21, 22 which may be referred to as the output windings, are connected in series with the emitters respectively while the windings 23, 24 which may be referred to as feedback or input windings, are connected to the transistor bases. The collectors are connected together to a voltage supply terminal 33 which, for type NPN transistors, is connected to a source of positive voltage. The center of the transformer is connected to a companion terminal 34 which is returned to the negative supply terminal thereby to complete the output circuit. Resistors 35, 36 connected in series with the transistor base terminals tend to keep the base current within safe limits while the resistors 37, 38 which shunt the transformer windings 21, 22 serve a damping function. The output may be taken from the emitter of the transistor 32 as shown, providing an output terminal 39.

For the purpose of insuring that the voltage supplied to the supply terminals 33, 34 remains substantially constant in spite of variations in the supply, the supply circuit, indicated generally at 40 includes a zener bridge having legs 41, 42, 43 with a zener diode 44 completing the fourth leg. A battery or the like 45 is connected across the bridge input terminals. The output is applied to the circuit terminals 33, 34 as shown. A zener bridge of this type is per se well known by those skilled in the art, and it will suffice to say that a substantially constant voltage is maintained across the supply terminals 33, 34 in spite of variations which may occur at the source 45.

The circuit as thus far described constitutes a magnetic oscillator in which the transistors alternately conduct to drive the core 25 of the transformer alternately to positive and negative saturation. The nominal frequency of oscillation is determined primarily by the number of turns in the transformer windings, the amount of core material, and the applied voltage.

In accordance with the present invention, means are provided for applying a synchronizing signal having a frequency which is a high multiple of the nominal frequency of the magnetic oscillator, with the source of synchronizing signal being coupled to the magnetic oscillator so that saturation of the transformer core is either slightly accelerated or slightly delayed depending upon the relative phase of the synchronizing signal in the region of saturation. More specifically, in accordance with the invention, means are provided for applying a synchronizing signal which is ineffective during the major portion of the oscillatory cycle of the transformer but which is effective at the threshold of saturation to accelerate or delay saturation depending upon the phase of the synchronizing wave. In this way a corrective change in the frequency of the magnetic oscillator is brought about so that the frequency at the output is maintained at a precise submultiple of the high frequency synchronizing signal. In one embodiment of the invention illustrated in FIG. 1 the synchronizing signal is applied directly to the transformer 20 via an auxiliary winding 50 to set up a synchronizing flux signal in the transformer core. The synchronizing signal, which is preferably in the form of a sine wave, is applied to the synchronizing input terminal 51 which is connected to one end of the auxiliary winding 50, the other end of the winding being grounded.

In explaining how synchronization is achieved by the present circuit, which will be done in connection with FIGS. 2 and 2*a* of the drawing, it will be helpful to have in mind a practical embodiment capable of performing frequency division in the ratio of 500:1, a ratio difficult and expensive to achieve using ordinary techniques. It will be assumed that an output of 200 cycles per second is desired using a 100 kilocycle sine wave synchronizing signal. To accomplish this the circuit constants are adjusted so that the frequency of oscillation is a nominal 200 cycles. In a practical case the windings 21, 22 of the transformer may be made of 500 turns, the windings 23, 24 of 40 turns, and the synchronizing input winding may consist of 100 turns, all of the windings being of #34 copper wire. The windings are linked by a core formed of a length of magnetic tape ¼" wide by 0.004 inch in thickness wound into an annulus having an inner diameter of 0.750 inch and an outer diameter of 1.000 inch. The transistors may be of the type 2N696. The base and shunting resistors may have a value of 150 and 4700 ohms, respectively. The voltage source is such that a voltage of 12 volts is applied across the supply terminals 33, 34. Reliable synchronization is achieved applying a sine wave having a voltage within the range of 0.7 to 1.5 volts R.M.S.

When voltage is applied to the oscillator circuit, one of the two transistors will tend to conduct slightly more heavily than the other, i.e., tend to predominate. It will be assumed that the transistor first to conduct is transistor 31. The conduction through the associated transformer winding 21 causes a voltage to be induced in the winding 23 which is of such a polarity as to positively bias the transistor for conduction. Simultaneously a voltage is induced in the winding 24 which is in a direction to cut off conduction in the transistor 32. The action being cumulative, transistor 31 immediately begins to conduct a square wave of current at a level indicated at 61 in FIG. 2. The magnitude of the current is dependent upon the impedance, i.e., the resistance and inductance in the output circuit of the transistor as well as the magnitude of the applied voltage. Conduction persists at such level over substantially the entire half-cycle, in the case of the circuit designed for 200 cycles per second for almost $\frac{1}{400}$ second. During this time interval the synchronizing signal, indicated at 62, goes through many cycles, 249 out of the 250 which define the half-cycle of output. As the threshold of saturation, indicated at 63, is reached, the impedance of the transformer winding 21 tends to drop suddenly tending to produce a sudden increase in the amount of current flow. At the threshold of saturation the amount of magnetizing force, i.e., the ampere turns applied to the core, is critical in determining the instant of saturation. Thus in the event that the synchronizing signal is undergoing the negative portion of its cycle at the threshold condition, the amount of total ampere turns will be slightly reduced, delaying the moment of saturation, whereas, if the synchronizing signal is in the positive portion of its cycle, the effect will be to produce an augmented value of ampere turns thereby to accelerate the achieving of saturation.

To illustrate the operation, it will be assumed in connection with FIG. 2 that the frequency of oscillation of the magnetic oscillator tends to be slightly "fast," corresponding to a "short" period, as indicated by the dotted line 64, and so that at the threshold of saturation 63 the current in the synchronizing circuit is in the negative portion 65 of the cycle, i.e., subtractive. This delays the threshold of saturation from point 63 to a slightly later point 65 so that the current rises along the solid line 66 thereby producing a half-period *t*/2 which is a precise multiple of the half-period of the synchronizing signal. Or, stated conversely, the frequency of the output signal is caused to be a precise submultiple, in the present instance $\frac{1}{500}$, of the frequency of the synchronizing signal.

Assuming next that the frequency of the magnetic oscillator tends to be slightly "slow" having a period which is slightly too "long," the phase of the synchronizing signal which exists at the threshold of saturation brings about correction in the opposite direction. Thus referring to FIG. 2*a* the output signal is indicated at 61*a* and the synchronizing signal at 62*a*. Absent the present synchronizing means, the threshold of saturation would tend to be at point 63*a* causing current to rise sharply along the dotted line 64*a*. However, at the threshold condition the existing phase of the synchronizing signal is positive thereby augmenting the flux in the transformer core. As a result the condition of saturation is accelerated, with the threshold point being shifted to the left to a point 65*a*, so that current rises along the solid line 66*a* thereby accelerating the end of the conduction cycle. This causes the half-period of conduction $t/2$ to be precisely the same as in FIG. 2.

When saturation occurs the sudden increase of current is not accompanied by any proportionate increase in the voltage induced in the winding 23 and which is applied to the input of the transistor 31. Consequently conduction in the transistor 31 tends immediately to decrease. Such reversal in "rate of change" causes a change in the direction of the voltages induced in the windings 23, 24 causing the transistor 31 to be negatively biased while the transistor 32 is biased for conduction initiating current flow in the transistor 32. As conduction begins in the transistor 32, conduction in the first transistor 31 is terminated completely and a current build-up occurs in the transistor 32 rapidly and as previously described in connection with the transistor 31. Since the circuit is symmetrical, it will be understood that the current flowing in the transistor 32 has the same square wave shape as has previously been discussed in connection with FIGS. 2 and 2*a*, the only difference being that the threshold of saturation is achieved in the core in the negative direction. The then existing phase of the synchronizing signal causes saturation to be either delayed or accelerated so that the current wave of the transistor 32 has the same half-period $t/2$ as that of the transistor 31. This completes a cycle of output and such cycle is repeated at a rate, in the present example, of precisely 200 cycles per second. Frequency division by a factor of 500 has thus been achieved.

For simplicity, the invention has been discussed in connection with positive and negative phase conditions of the synchronizing wave. It will be understood that these opposite conditions are not necessary for successful operation and that saturation will be accelerated or delayed in practice, depending upon variations in relative phase from a reference value.

In the embodiment of the invention described above, the synchronizing signal is caused to correctively delay or accelerate the condition of saturation by the setting up of an auxiliary synchronizing flux in the transformer core via the auxiliary winding 50. It will be understood by those skilled in the art, however, that the invention is not limited thereto and that delaying or accelerating the condition of positive and negative saturation may be brought about by other means without departing from the invention. Thus, in accordance with one of the aspects of the invention, means are provided for bringing about a corrective frequency exchange by increasing or decreasing the applied voltage depending upon the phase of the synchronizing signal at the time of saturation. More specifically, a phase detector is provided for ascertaining the relative phase of the synchronizing signal at the time of saturation and for producing an auxiliary voltage, in series with the regular supply voltage, having a polarity and magnitude which depends upon the direction and amount of the relative phase displacement of the synchronizing signal.

Referring to FIG. 3 the components of the oscillator circuit 10*a* will be understood to correspond to those in the oscillator 10 of FIG. 1; hence corresponding reference numerals have been employed with subscript *a*. In carrying out the invention a phase detector 70 is provided having a first input 71 which is connected to the source of synchronizing signal, a second input 72 which is connected to the output of the magnetic oscillator and an output 73 which is connected in series with a source 74 of supply voltage. The phase detector includes a transformer 80 having an input winding 81 and output windings 82, 83. Connected in series with the output windings are diodes 85, 86. In order to make the phase detector non-responsive during the major portion of the conducting cycle and responsive to the relative phase during the high current conditions existing at the time of saturation, negative bias is provided in the central leg of the circuit in the form of a battery or the like 88. The magnetic oscillator output is injected into the central leg by a transformer 90 having a primary winding 91 and a secondary winding 92. The upper portion of the circuit has an output resistor 93 shunted by a capacitor 94 while the lower portion of the circuit has an output resistor 95 shunted by a capacitor 96.

In operation, conduction will occur alternately in the transistors 31*a*, 32*a* as described in connection with the preceding embodiment. Because of the negative bias provided by the battery 88, neither diode 85, 86 will conduct during the major portion of the conduction cycle. However, during current peaks, the voltage across the secondary winding 92 of the transformer in the second channel, and which is in series with the bias voltage, rises to the point where the opposing bias is effectively neutralized. Thus one or the other of the diodes 85, 86 is enabled to conduct depending upon the instantaneous relative phase of the synchronizing signal applied to the transformer 80. As a first possible condition it will be assumed, as was assumed in FIG. 2, that the magnetic oscillator tends to operate at a frequency which is slightly too high. Under such conditions the instantaneous phase of the synchronizing signal will be in a direction to favor conduction in the diode 85 in the upper portion of the circuit. Such conduction will cause current to flow in the resistor 93 of the output resulting in a build-up of charge across the associated capacitor 94 having the polarity shown. Such polarity is in a direction to oppose the polarity of the voltage source 74. It will be understood by one skilled in the art that the expression for the frequency of a magnetic oscillator of the present type is given by:

$$F=kE/4N\phi_s$$

where E is the applied voltage, N is the number of turns, $\phi_s$ is the saturation flux, and $k$ is a constant. It will be apparent, then, that the reduction in the effective applied voltage E will cause a decrease in the frequency and conversely an increase in a half-period of current indicated at $t/2$ in FIG. 2. To bring out the similarity with the earlier embodiment, the lower effective applied voltage causes the condition of saturation in the subsequent wave, or waves, to be delayed.

Under the opposite condition, i.e., where the frequency of the magnetic oscillator tends to be on the low side and the period slightly too long as illustrated in FIG. 2*a*, the following occurs: following the threshold of saturation, the peak current "conditions" the diodes for conduction by reason of the voltage developed in the central leg of the circuit. At that time the phase of the synchronizing signal is such as to produce a voltage in the secondary which is polarized for conduction in the diode 86. Conduction takes place in the resistor 95 at the output, charging the capacitor 96 with a voltage which is positive at the lower terminal and negative at the upper, i.e., a voltage which is additive with respect to the main supply voltage 74. This produces an effective increase in the voltage E applied to the magnetic oscillator circuit causing saturation of the core to be accelerated thereby shortening the period of conduction and increasing the frequency of oscillation. Since the change takes place correctively in each direction, the frequency of oscillation is maintained precisely at the desired submultiple of the frequency of the synchronizing source, just as in the case of the circuit of FIG. 1. The two embodiments of the invention, as has been pointed out, employ the same basic concept to secure synchronization, accelerating or delaying the achieving of saturation in succeeding transformer cycles. However, in comparing the two it should be kept in mind that there are points of difference which might determine which of the two circuits will be more satisfactory for a given application. Thus it is characteristic of the embodiment shown in FIG. 1 that the condition of saturation is either accelerated or delayed in the same half-cycle that phase comparison takes place, whereas in the embodiment of FIG. 3 the phase comparison which is made during one half-cycle is caused to produce an auxiliary voltage which is applied during the succeeding half-cycle or cycles, depending upon the time constant of the circuit, i.e., depending upon the capacitance of the capacitors 94, 96. The term "region of saturation" used in the claims to apply to the end of each conducting half-cycle is therefore intended to be generic to the threshold of saturation which is particularly significant in FIG. 1 and to the condition of peak current flow which is especially significant in FIG. 3.

While the invention has been described in connection with a particular circuit of magnetic oscillator used in both FIGS. 1 and 3, it will be understood that the invention is not limited thereto but is applicable to other specific oscillators having a transformer core of readily saturated material which is oscillated between the conditions of positive and negative saturation along a substantially rectangular hysteresis loop. Such oscillator may have four windings or winding portions, as disclosed, or a lesser number of windings, the windings 23, 24 being dispensed with, if different feedback circuitry is used. Where a single winding is employed, the term "windings" may be construed to refer to the winding turns.

The invention has been explained herein in connection with a frequency division ratio of 500:1. It is found that such a high division ratio may be secured with complete reliability and the ratio may be increased, if desired, to 1000:1. One of the reasons for this capability is that the synchronizing signal can have no effect during the major or constant current portion of the cycle which, in a practical case, may occupy $^{999}/_{1000}$ of the total period. Stated in other terms, the synchronizing signal is only effective during the region of saturation which may occupy only the final $^{1}/_{1000}$ of the total period of conduction. Thus, the oscillator "selects" and "reads" the phase of only a desired single cycle of the synchronizing signal to determine whether saturation shall be slightly delayed or accelerated as necessary to establish a precise period of oscillation. In the embodiment of FIG. 1 the synchronizing signal is disabled by reason of the fact that the current which is applied to the synchronizing winding 15, and the flux which it sets up, is only a fraction of the transistor load current and its flux. Consequently, the rapidly varying synchronizing flux is ineffective to achieve saturation, i.e., to trigger the circuit, until the threshold of saturation is reached, at which time the synchronizing signal is enabled to delay or accelerate the point of achieving saturation by the minute time interval required to achieve perfect synchronization. In the second embodiment shown in FIG. 3, the synchronizing signal applied to the first input channel is disabled by reason of the fact that the diodes are normally biased against conduction. Conversely the synchronizing signal in FIG. 3 is "enabled" only during the small terminal interval of peak current since such peak current produces a voltage in the central leg of the circuit which is sufficient to overcome the effect of the negative bias.

The present device is thus to be contrasted with conventional frequency dividers which make use of either a linear or slowly rising voltage or current characteristic and where the region of switch-over is so broad and indeterminate that the synchronizing signal must be relatively low frequency. Thus while division ratios which may be obtained using conventional techniques are limited to about 10:1, with the present device, as stated, division ratios of 1000:1, or even greater, are theoretically possible. Good synchronization action should occur as long as the width of the current spike is less than about one-half of the period of the high frequency input wave. It is within the skill of the art, with the above teachings in mind, to select core materials and transistors to minimize the widths of the current spike. Where it is desired to achieve extremely high frequency ratios care should be taken to regulate or stabilize the free running frequency of the magnetic oscillator by maintaining an accurate input voltage and by use of the frequency compensation techniques.

Observations indicate that the present frequency dividing synchronous oscillator, in addition to enabling high division ratios, is independent of the shape of the synchronizing wave, provided that the wave has a sloping portion and provided that the wave is repetitive. Moreover, synchronization is achieved even where the synchronization is derived from a circuit having a high impedance and low power capability. Consequently, the present frequency dividing synchronous oscillator may be utilized as a frequency dividing power amplifier.

It will be appreciated that the present frequency dividing synchronous oscillator not only enables large division ratios to be achieved but also obtains the result using a minimum number of readily available components. The circuit is susceptible to extreme miniaturization; this, combined with low average current drain, makes the device useful as a building block in larger circuit assemblies employed in remote locations where reliability and long life are essential.

I claim as my invention:

1. In a frequency dividing synchronous oscillator the combination comprising a transformer having a core and winding thereon, said core being composed of readily saturated magnetic material characterized by a generally rectangular hysteresis loop, a source of relatively high frequency synchronizing signal, a source of supply voltage, first and second transistors supplied by said voltage source and having their input and output circuits connected to said transformer windings symmetrically in opposed phase relation so that the transistors conduct alternately, passing a square wave of current at a substantially constant magnitude over a relatively long interval prior to saturation followed by a sharp peak of current over an extremely short time interval in the region of saturation, the winding turns, amount of core material, and applied voltage being such that the period of the said square wave is many times the period of oscillation of the synchronizing signal, and means responsive to the relative phase of the synchronizing signal only during said short interval in the region of saturation to accelerate such saturation when the polarity of the synchronizing signal is such as to indicate that the period of the said square wave is longer than a desired multiple of the period of the synchronizing signal, and to delay such saturation when said polarity is such as to indicate that the period of the said square wave is shorter than said desired multiple, for correctively adjusting the frequency of oscillation of the transformer so that the latter is held at a precise submultiple of the frequency of the synchronizing signal, said synchronizing signal being ineffective during said relatively long interval prior to saturation.

2. In a frequency dividing synchronous oscillator the combination comprising a transformer having a core and windings thereon, said core being composed of readily saturated magnetic material characterized by a generally rectangular hysteresis loop, a source of relatively high frequency synchronizing sine waves, a source of supply voltage, first and second transistors supplied by said voltage supply and having their input and output circuits connected to said transformer windings symmetrically in opposed phase relation so that the transistors conduct alternately, passing a square wave of current at a substantially constant magnitude over a relatively long interval leading to the threshold of saturation followed by a sharp peak of current over an extremely short time interval as saturation is exceeded, the peak having a width which is less than about one-half of the period of said synchronizing sine waves, and means responsive to the relative phase of the synchronizing sine waves only during the short interval of threshold and peak current to accelerate saturation when the polarity of the synchronizing sine waves is such as to indicate that the period of the said square wave is longer than a desired multiple of the period of the synchronizing sine waves, and to delay saturation when said polarity is such as to indicate that the period of the said square wave is shorter than said desired multiple, for correctively adjusting the frequency of oscillation of the transformer so that the latter is held at a precise submultiple of the frequency of the synchronizing sine waves, said synchronizing sine waves being ineffective during said relatively long interval leading to the threshold of saturation.

3. In a frequency dividing synchronous oscillator the combination comprising a transformer core and windings thereon, the core being composed of readily saturated magnetic material having a generally rectangular hysteresis loop, a source of relatively high frequency synchronizing signal, a source of supply voltage, switch means connected to the source of supply voltage and having input and output circuits connected to the transformer windings, said switch means including a feedback connection and being so constructed and arranged that the transformer core is alternately driven to positive and negative saturation at a nominal frequency which is a submultiple of that of the synchronizing signal, means for coupling the source of synchronizing signal to the transformer, said coupling means including means for causing the synchronizing signal to be effective only when the core is in the region of saturation and ineffective at all other times, said coupling means further including means responsive to the relative phase of the synchronizing signal only when the transformer core is in the region of saturation to accelerate such saturation when the polarity of the synchronizing signal is such as to indicate that the time period required to drive said core from one saturation state to the opposite saturation state is longer than a desired multiple of the period of the synchronizing signal, and to delay such saturation when said polarity is such as to indicate that said saturation time period is shorter than said desired multiple, for correctively accelerating or delaying the achievement of saturation thereby to correctively vary the frequency of oscillation of the transformer so that oscillation takes place at a frequency which is a precise submultiple of the frequency of the synchronizing signal.

4. In a frequency dividing synchronous oscillator the combination comprising a transformer having a core and windings thereon, the core being composed of readily saturated magnetic material having a generally rectangular hysteresis loop, a source of synchronizing signal in the form of a train of synchronizing waves, a source of supply voltage, switch means having input and output circuits connected to the transformer windings and including a feedback connection so that the transformer tends to oscillate between conditions of positive and negative saturation at a predetermined nominal frequency of oscillation, means for coupling the source of synchronizing signal to the transformer with the coupling means being so constructed and arranged that the synchronizing signal is enabled to affect the operation of the transformer only during the extremely small time interval that the core is in the region of saturation and so that the synchronizing signal is ineffective at all other times, said coupling means including means responsive to the phase of the synchronizing signal only during the small time interval that the transformer is in the region of saturation to accelerate such saturation when the polarity of the synchronizing signal is such as to indicate that the time period required to drive said core from one saturation state to the opposite saturation state is longer than a desired multiple of the period of the synchronizing signal, and to delay such saturation when said polarity is such as to indicate that said saturation time period is shorter than said desired multiple, for correctively accelerating or delaying the achievement of saturation depending upon whether the oscillation of the transformer is lagging or leading the phase of the synchronizing signal.

5. In a frequency dividing synchronous oscillator the combination comprising a source of relatively high frequency synchronizing signal in the form of a train of waves, an oscillator having a saturable transformer characterized by a generally rectangular hysteresis loop as well as switch means and source of current for driving the transformer to positive and negative saturation at a nominal oscillatory frequency which is a submultiple of the frequency of the synchronizing signal, means associated with the oscillator to accelerate such saturation when the polarity of the synchronizing signal is such as to indicate that the time period required to drive said core from one saturation state to the opposite saturation state is longer than a desired multiple of the period of the synchronizing signal, and to delay such saturation when said polarity is such as to indicate that said saturation time period is shorter than said desired multiple, for slightly delaying or accelerating saturation depending upon the relative phase of the synchronizing signal, and means for effectively coupling the source of synchronizing signal to the delaying and accelerating means only at the time of saturation so that saturation is correctively delayed or accelerated thereby to cause oscillation at a frequency which is a precise submultiple of the synchronizing signal and so that the synchronizing signal is ineffective at all other times.

6. In a frequency dividing synchronous oscillator the combination comprising a transformer having a core and a plurality of windings thereon, the core being composed of readily saturated magnetic material having a generally rectangular hysteresis loop, first and second transistors each having an input circuit and an output circuit, a source of relatively high frequency synchronizing signal, a source of current for supplying the output circuits of said transistors, the input and output circuits of said transistors being connected to the windings symmetrically in opposite phase relation and said windings having a predetermined number of turns so that the core is alternately driven to positive and negative saturation at a nominal oscillatory frequency which is a submultiple of the frequency of the synchronizing signal, and means for coupling the source of synchronizing signal to the windings on said transformer with the coupling means being so constructed and arranged that the sychronizing signal is effective only in the region of saturation to accelerate such saturation when the polarity of the synchronizing signal is such as to indicate that the time period required to drive said core from one saturation state to the opposite saturation state is longer than a desired multiple of the period of the synchronizing signal, and to delay such saturation when said polarity is such as to indicate that said saturation time period is shorter than said desired multiple, to correctively delay or accelerate saturation thereby to cause oscillation at a frequency which is a precise submultiple of the synchronizing signal, said synchronizing signal being ineffective at all other times.

7. In a frequency dividing synchronous oscillator the combination comprising a source of high frequency synchronizing signal, a transformer having a core of readily saturated material characterized by a generally rectangular hysteresis loop and having a set of windings thereon, first and second switches having input and output circuits connected to the windings, a current source connected to the output circuits of said switches and the input and output circuits being symmetrically connected in phase opposition so that the core is driven alternately to positive and negative saturation at a certain nominal frequency which is a submultiple of the synchronizing signal, means for feeding the synchronizing signal to one of the windings on said transformer to produce an auxiliary flux signal in the core which is effective only in the region of saturation to accelerate such saturation when the polarity of the sychronizing signal is such as to indicate that the time period required to drive said core from one saturation state to the opposite saturation state is longer than a desired multiple of the period of the synchronizing signal, and to delay such saturation when said polarity is such as to indicate that said saturation time period is shorter than said desired multiple, to correctively accelerate or delay saturation thereby to maintain oscillation precisely at said nominal rate, said synchronizing signal being ineffective at all other times.

8. In a frequency dividing sychronous oscillator the combination comprising a source of high frequency synchronizing signal, a transformer having a core of readily saturated material characterized by a generally rectangular hysteresis loop and having a set of windings thereon, first and second switches having input and output circuits connected to the windings, a current source connected to the output circuits of said switches and the input and output circuits being symmetrically connected in phase opposition so that the core is driven alternately to positive and negative saturation at a certain nominal frequency which is a submultiple of the synchronizing signal, and an auxiliary winding on said core connected to said source of synchronizing signal to produce an auxiliary flux signal in the core which is effective only in the region of saturation to accelerate such saturation when the polarity of the synchronizing signal is such as to indicate that the time period required to drive said core from one saturation state to the opposite saturation state is longer than a desired multiple of the period of the synchronizing signal, and to delay such saturation when said polarity is such as to indicate that said saturation time period is shorter than said desired multiple, to correctively accelerate or delay saturation thereby to maintain oscillation precisely at said nominal rate, said synchronizing signal being ineffective at all other times.

9. In a frequency dividing synchronous oscillator the combination comprising a magnetic oscillator including a transformer having a core and windings thereon, the core of the transformer being made of readily saturated magnetic material having a generally rectangular hysteresis loop, a source of current, a source of high frequency synchronizing signal, switch means connected to the transformer windings and to the source of current and including a feedback connection so that the core is alternately driven to its limits of positive and negative saturation with the turns on the transformer being in such number that the oscillation takes place at a predetermined nominal frequency which is a submultiple of the frequency of the synchronizing signal, and means for feeding said synchronizing signal to one of the transformer windings to produce a synchronizing flux in said core which is effective only in the region of saturation to accelerate such saturation when the polarity of the synchronizing signal is such as to indicate that the time period required to drive said core from one saturation state to the opposite saturation state is longer than a desired multiple of the period of the synchronizing signal, and to delay such saturation when said polarity is such as to indicate that said saturation time period is shorter than said desired multiple, to correctively accelerate or delay saturation thereby to cause oscillation to occur at precisely said nominal frequency, said synchronizing signal being ineffective at all other times.

10. In a frequency dividing synchronous oscillator the combination comprising a transformer having a core and windings thereon, the core of the transformer being composed of readily saturated magnetic material having a generally rectangular hysteresis loop, a source of relatively high frequency synchronizing signal, a source of supply voltage, switch means connected to the voltage source and having input and output circuits connected to the transformer winding, said switch means including a feedback connection so that the transformer core is driven alternately to positive and negative saturation at a nominal oscillatory frequency which is a submultiple of the frequency of the synchronizing signal, and means responsive to changes in phasing between the synchronizing signal and the oscillation of said transformer only in the region of saturation to accelerate such saturation when the polarity of the synchronizing signal is such as to indicate that the time period required to drive said core from one saturation state to the opposite saturation state is longer than a desired multiple of the period of the synchronizing signal, and to delay such saturation when said polarity is such as to indicate that said saturation time period is shorter than said desired multiple, for correctively adjusting the voltage of the supply so that the frequency of oscillation of the transformer tends to remain in precise submultiple synchronism with the sychronizing signal, said synchronizing signal being ineffective outside the region of saturation.

11. In a frequency dividing synchronous oscillator the combination comprising a transformer having a core and windings thereon, the core of the transformer being composed of readily saturated magnetic material having a generally rectangular hysteresis loop, a source of relatively high frequency synchronizing signal, a source of supply voltage, switch means connected to the voltage source and having input and output circuits connected to the transformer winding, said switch means including a feedback connection so that the transformer core is driven alternately to positive and negative saturation at a nominal oscillatory frequency which is a submultiple of the frequency of the synchronizing signal, and means responsive to the relative phasing beween the synchronizing signal and the oscillation of said transformer only in the region of saturation during one cycle of the latter to accelerate such saturation when the polarity of the synchronizing signal is such as to indicate that the time period required to drive said core from one saturation state to the opposite saturation state is longer than a desired multiple of the period of the synchronizing signal, and to delay such saturation when said polarity is such as to indicate that said saturation time period is shorter than said desired multiple, for correctively adjusting the voltage of said source which is effective during a succeeding cycle so that the frequency of oscillation of the transformer tends to remain in precise submultiple synchronism with the synchronizing signal, said synchronizing signal being ineffective outside the region of saturation.

12. In a frequency dividing synchronous oscillator the combination comprising a transformer having a core and windings thereon, the core being composed of readily saturated magnetic material having a generally rectangular hysteresis loop, a source of relatively high frequency synchronizing signal, a source of supply voltage, switch means having input and output circuits connected to said windings and including a feedback connection so that the core tends to be driven in the direction of positive and negative saturation alternately, the number of winding turns, amount of core material and voltage being such that oscillation tends to take place near a frequency which is a submultiple of the frequency of the synchronizing signal, a phase detector having first and second inputs and an output, the source of synchronizing signal being connected to the first input, the transformer windings being coupled to the second input, the phase detector being so constructed and arranged that the output thereof varies in polarity depending upon the phase displacement of the transformer oscillation with respect to the synchronizing signal, and means for connecting the output of the phase detector to the voltage source to accelerate such saturation when the polarity of the synchronizing signal is such as to indicate that the time period required to drive said core from one saturation state to the opposite saturation state is longer than a desired multiple of the period of the synchronizing signal, and to delay such saturation when said polarity is such as to indicate that said saturation time period is shorter than said desired multiple, to produce a corrective variation in applied voltage so that oscillation of the transformer tends to remain in precise synchronism with the synchronizing signal, said phase detector being effective only in the region of saturation so that said synchronizing signal is ineffective outisde the region of saturation.

References Cited

UNITED STATES PATENTS

| | | | |
|---|---|---|---|
| 2,582,603 | 1/1952 | Phelan | 331—51 |
| 2,954,532 | 9/1960 | Pentecost et al. | 331—113 |

OTHER REFERENCES

J. L. Jensen, IRE Transactions On Circuit Theory, "An Improved Square-Wave Oscillator Circuit," September 1957, pp. 276–279.

JOHN KOMINSKI, *Primary Examiner.*